AUDIO FREQUENCY REJECT FILTER

Filed July 8, 1966

INVENTOR.
Alfonso DeLoach
BY
Dox D. Doty
Attorney 3,530,394

AUDIO FREQUENCY REJECT FILTER

Alfonso DeLoach, Panama City, Fla., assignor to the United States of America as represented by the Secretary of the Navy Filed July 8, 1968, Ser. No. 743,219
Int. Cl. H03f *13/00*
U.S. Cl. 330—60 14 Claims

ABSTRACT OF THE DISCLOSURE

A filter for cancelling a predetermined frequency component from a composite signal having a plurality of frequency components, said filter including a tuning fork having a resonant frequency identical to the frequency of said predetermined frequency component to be cancelled, an inductance coil for electro-magnetically driving said tuning fork into vibration at its resonant frequency in response to said predetermined frequency component, an accelerometer for generating an electrical signal corresponding to the resonant frequency of said tuning fork in response to the vibration thereof, an adjustable amplifier for amplifying said electrical signal to an amplitiude equal to that of said predetermined frequency component to be cancelled, a variable phase shifter for inverting said amplified electrical signal, and a comparator for algebraically adding said inverted electrical signal with the aforesaid composite signal in order to produce an output signal equal to the difference thereof.

Figures 1, 2:
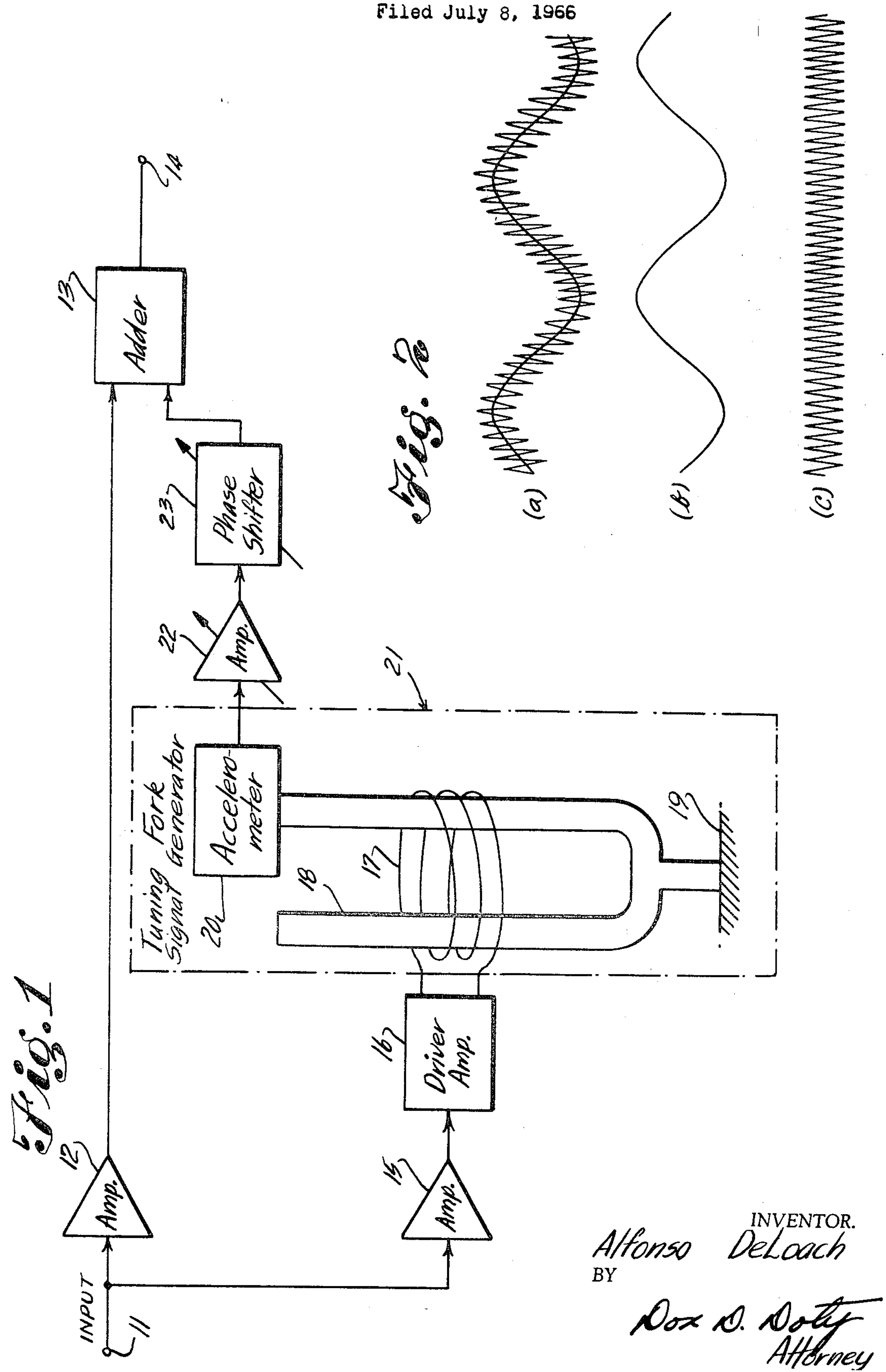

The invention described herein may be manufactured and used by or for the Government of the United States of America for governmental purposes without the payment of any royalties thereon or therefor.

The present invention relates generally to signal filters and, in particular, it is a system for cancelling or rejecting a predetermined spurious signal component, having a frequency within the audio frequency range, from among other wanted electrical intelligence signals of some other frequency or frequencies.

Heretofore, numerous methods and means have been employed to improve the quality of signals being processed by various and sundry devices for many practical purposes. For example, filters have been conceived and used for the purpose of cancelling, neutralizing, or minimizing unwanted signals such as static, chaff, clutter, or hum from otherwise meaningful signals being processed by radio, radar, and sonar receivers, and the like, as well as many other instruments and data processing systems. Unfortunately, however, most of these devices, although sometimes satisfactory for their particular purpose, are unduly complex and leave a great deal to be desired. Moreover, they are ordinarily quite limited in their application because they may be only compatible with a particular apparatus. In many instances, they merely depend on phase shifters or delay lines to provide such conditions among the signals being processed that cancellation of an unwanted signal contained therein may be subsequently effected by a comparator means or the like. But such procedures alone usually result in a reduced signal cancellation accuracy and reduced available bandwidth for the data signals involved and, consequently, the possible resolution and fidelity thereof within the utilization apparatus to which they are applied may be inordinately restricted.

LC type electronic filters have also been used in the past for the purpose of rejecting an unwanted signal frequency from intelligence signals otherwise being processed for other useful purposes. Unfortunately, such filters are limited by the width of the reject frequency band, particularly at the low audio frequencies of from 60 to 120 cycles per second, because the Q thereof is of the order of several hundred at best.

The subject invention overcomes many of the difficulties encountered in the aforementioned prior art, inasmuch as it has a relatively high Q—of the order of several thousand—and, thus, provides a very narrow reject band which does not adversely affect the intelligence or data signals combined therewith.

It is, therefore, an object of this invention to provide an improved signal reject filter.

Another object of this invention is to provide an improved audio frequency signal cancellation filter.

Still another object of this invention is to provide an improved method and means for automatically deleting a spurious signal having a particular frequency within the audio band from among one or more other frequency signals combined therewith.

A further object of this invention is to provide an improved method and means for increasing the signal-to-noise ratio of a data signal supplied to a given utilization apparatus.

Another object of this invention is to provide an audio frequency filter having an exceptionally narrow reject band.

Another object of this invention is to provide an audio frequency reject filter with an exceedingly high Q.

Another object of this invention is to provide an improved method and means for precisely eliminating a predetermined audio frequency component from a composite electrical signal.

Another object of this invention is to provide an improved method and means to substantially eliminate the humming noise ordinarily accompanying alternating current power supplies and the utilization apparatus with which they are combined.

A further object of this invention is to provide a simple, reliable audio frequency reject filter which may be easily and economically manufactured, maintained and operated.

Other objects and many of the attendant advantages will be readily appreciated as the subject invention becomes better understood by reference to the following detailed description, when considered in conjunction with the accompanying drawings wherein:

FIG. 1 is a combination schematic and block diagram of the system constituting this invention; and FIG. 2 is an idealized and somewhat exaggerated graphical representation of various waveforms that may occur within the system of FIG. 1.

Referring now to FIG. 1, there is shown an input terminal 11 which is adapted for receiving the data signal from which the predetermined audio frequency component is to be removed. It, of course, may be connected to any suitable equipment or apparatus that will supply said data signal thereto.

Input terminal 11 is connected to the input of an amplifier 12—which, for instance, may be any suitable isolation amplifier, or the like—the output of which is connected to one of the inputs of a comparator type device, such as adder circuit 13. The output of adder 13 is connected to an output terminal 14.

Output terminal 14 is the output of the subject invention and, like input terminal 11, is also adapted for being connected to any appropriate utilization equipment or apparatus that will advantageously receive the output signal therefrom.

Input terminal 11 is also connected to the input of another amplifier 15 which, like the aforesaid amplifier 12, may be an isolation amplifier, if, so desired. The output of amplifier 15 is connected to the input of a suitable driver amplifier 16, the outputs of which are respectively connected to the terminal ends of an inductance coil 17. Coil 17 is wound around a tuning fork 18 in such manner as to electromagnetically drive it into its predesigned resonant frequency vibration whenever properly energized to do so.

Tuning fork 18 may be of any suitable conventional type and is preferably mounted on a base 19 adapted to hold it securely in some preferred geometrical configuration or location. It, of course, would be well within the purview of one skilled in the art having the benefit of the teachings presented herewith to design said tuning fork 18 to have whatever resonant frequency characteristics that is necessary to cancel the unwanted signal frequency component from any given electrical composite input signal applied to the invention.

Attached to one of the prongs or tines of tuning fork 18 is an accelerometer 20 of the type which produces an electrical output signal having polarities and amplitudes respectively in proportion to the direction and magnitude of the physical movement thereof. Attachment thereof to said tuning fork prong may, of course, be made by any suitable conventional means (such as, by welding, bolting, or the like), just so long as the attachment is sufficiently secure that accelerometer 20 will move with the prong of tuning fork 18 to which it is attached, regardless of the frequency at which it is vibrating.

As may readily be seen from FIG. 1, inductance coil 17, tuning fork 18, mounting base 19, and accelerometer 20 are uniquely combined in such manner as to provide a unique electrical signal generator, herewith defined as a tuning fork signal generator 21.

The output of tuning fork signal generator 21 is actually taken from the output of accelerometer 20, and it is connected to the input of an adjustable gain amplifier 22. The output of amplifier 22 is coupled to the input of a variable phase shifter 23, which is preferably of the type that is capable of shifting the phase of the input signal 180° plus or minus an adjustable amount. For this purpose, appropriate adjustable logical inverters or variable delay lines may be used, if so desired. The output of phase shifter 23 is connected to the remaining input of the aforesaid adder 13.

At this time, it would perhaps be worthwhile to note that with the exception of tuning fork signal generator 21, all of the elements portrayed in block form in FIG. 1 are well known and conventional per se; hence, they are commercially available. Of course, all of the individual components of tuning fork signal generator 21 are, likewise, conventional per se, although insofar as it is known, no such unique combination of elements existed until the time of this invention. Said combination of elements is, of course, not only unique structurally, but produces a result that is a vast improvement over prior art signal generators of similar purpose, viz., an electrical output signal having very, very accurate frequency control, with the frequency thereof being any specific selected frequency within the audio frequency range of 20 to 20,000 cycles per second. Obviously, since the frequency is controlled by the tuning fork, it must be designed to vibrate at whatever frequency the signal to be rejected or cancelled has.

It would perhaps also be noteworthy that tuning fork signal generator 21 produces results which could and probably would make it useful wherever an exceptionally accurate electrical signal within a mechanical vibratory range is needed. Such range, of course, could also conceivably include frequencies below and above the audio range—that is to say, within the subsonic or supersonic frequency ranges. Only the proper design choice of the tuning fork would be required to do so, although it may be necessary in the latter case to drive inductance coil 17 with a separate, suitably designed, high frequency oscillator or the like. Hence, it may readily be seen that tuning fork signal generator 21 could possibly have applications other than those herewith indicated.

On the other hand, in order for the entire system constituting this invention to operate in as optimum a manner as possible, the unique combination of elements comprising tuning fork signal generator 21 is required; therefore, the device of FIG. 1, likewise, includes a new combination of elements which produces vastly improved results not obtainable from the aforementioned or any other known prior art.

As previously suggested, the new combination of elements constituting this invention could most likely be employed to an advantage as an intermediate signal improving circuit or system which is connected between receiving transducer and receiver type utilization apparatus and between transmitter type equipment and broadcast transducers. Moreover, it could apparently be used to an advantage to filter and thus "purify" any electrical signal supplied to the input of test, measuring, recording, readout, and other instrumentation, thereby improving the fidelity of the information or data signals processed therein. Although numerous devices are suitable for being combined with the invention, a few rather important specific examples of some that could use the results it produces to a considerable advantage are: radio, radar, sonar, communications systems, data processing systems, computers, and various and sundry instrumentation and control systems.

The operation of the subject invention will now be discussed briefly as follows in conjunction with both figures of the drawing:

As a general rule, continuous electrical signals are the type of signals that are filtered by the invention; however, there may also be cases where intermittent signals are desired to be filtered, too. In either situation, the invention will function well, with the exception of where the interruptions in an intermediate signal are in synchronism with the design resonant frequency of the tuning fork. In such instance, it could ostensively be pulsed into oscillation by the data signal, rather than the frequency component desired to be cancelled or rejected.

If a signal containing an unwanted low frequency component and a higher frequency data component superimposed thereon, similar to that exemplarily depicted in FIG. 2(*a*), is applied to input terminal 11, it will be amplified to a more useful level by amplifiers 12 and 15 before being coupled to the components associated therewith, respectively.

In order to simplify the disclosure in this case, only three waveforms have been illustrated in FIG. 2; hence, although the amplitudes thereof may vary as a result of amplification, processing, etc., no attempt has been made to show such variations, except where they are critical to the operation of the invention.

As may be seen from FIG. 1, the input signal actually travels two paths or through two parallel channels: one through amplifier 12 to adder 13, and the other through series connected amplifier 15, driver amplifier 16, tuning fork signal generator 21, variable amplifier 22, and variable phase shifter 23 to said adder 13.

After again being amplified to a power level sufficient to drive tuning fork 18, the signal of FIG. 2(*a*) is supplied to inductance coil 17, where the excitation thereof electromagnetically drives the tines of tuning fork 18 at their resonant frequency, in the event a component of said input signal has said resonant frequency. Of course, if no such frequency is present therein, tuning fork 17 is not vibrated; but if it is present therein, it causes tuning fork 17 to be vibrated, regardless of any other frequency components that may concomitantly be present therein, too.

Being mechanically connected thereto, accelerometer 20 will pick up the vibrations of tuning fork 18, and by its inherent nature, the movement thereof will generate an electrical signal, the frequency of which is identical to the frequency of said vibrations. As a result, the low frequency component of the input composite electrical signal is effectively extracted therefrom by electromechanical means and then recreated as a newly-generated individual signal that is useful for other purposes. Such newly-generated signal is the output signal of tuning fork signal generator 21. It has a waveform—but not the amplitude or phase relationship—that is similar to that depicted in FIG. 2(*b*); and after further amplification by amplifier 22 and 180° phase shifting by phase shifter 23, it has a waveform exactly like that shown in FIG. 2(*b*). Hence, this signal is now equal and opposite to the low frequency component signal to be cancelled and is available to be used as a compensating means therefor.

It would perhaps be noteworthy at this time that both amplifier 22 and phase shifter 23 are manually or otherwise adjustable. Respective adjustments thereof will insure that the proper amplitude and phase relation are effected at the output of phase shifter 23 and, thus, that the output signal therefrom is capable of fully and completely cancelling the unwanted low frequency component of the signal typically represented in FIG. 2(*a*), once it is mixed therewith.

To actually effect such cancellation, the output signal of phase shifter 23 (that is, the signal waveform of FIG. 2(*b*)) is algebraically added to the suitably amplified original input signal (that is, the signal waveform of FIG. 2(*a*)) in adder 13. Consequently, the difference therebetween is that signal which is left after the spurious low frequency component has been deleted; and it is this difference signal that is the meaningful intelligence or data signal illustrated in FIG. 2(*c*) and, hence, is the output of the entire invention. As such, it is available for further use from output terminal 14.

In view of the foregoing, it may readily be seen that the subject invention is an audio frequency reject filter that serves an exceedingly useful purpose and does it in a superior manner.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A system for cancelling a predetermined frequency component from a composite electrical signal having several frequency components, comprising in combination:

a tuning fork having a resonant frequency indentical to that of the component of said composite signal to be cancelled;

means contiguously disposed with said tuning fork for the driving thereof in such manner as to make it vibrate at its resonant frequency in response to said predetermined frequency component of said composite signal;

means mounted on said tuning fork for converting the vibrational energy thereof into an electrical signal proportional thereto having a frequency identical therewith;

adjustable means effectively connected to the output of said vibrational energy converting means for shifting the phase of said electrical signal substantially one hundred and eighty degrees; and means effectively connected for receiving said composite electrical signal and connected to the output of said phase shifting means for algebraically adding said composite electrical signal and the aforesid phase shifted electrical signal and for producing an output signal equal to the difference therebetween.

2. The device of claim 1 wherein said means mounted on said tuning fork for converting the vibrational energy thereof into an electrical signal proportional thereto having a frequency identical therewith comprises an accelerometer.

3. The device of claim 1 wherein said adjustable means effectively connected to the output of said vibrational energy converting means for shifting the phase of said electrical signal one hundred and eighty degrees comprises a logical inverter.

4. The device of claim 1 wherein said adjustable means effectively connected to the output of said vibrational energy converting means for shifting the phase of said electrical signal one hundred and eighty degrees is a variable phase shifter.

5. The device of claim 1 wherein said means for algebraically adding said composite signal and the aforesaid phase shifted electrical signal comprises an adder.

6. The device of claim 1 wherein said means for algebraically adding said composite signal and the aforesaid phase shifted electrical signal comprises a comparator.

7. The invention of claim 1 further characterized by a variable gain amplifier connected between the output of said vibrational energy converting means and the input of the aforesaid electrical signal phase shifting means.

8. The invention according to claim 1 further characterized by means connected to said tuning fork for the mounting thereof in a predetermined geometrical configuration.

9. The invention of claim 1 further characterized by amplifier means having an input and an output, with the input thereof adapted for receiving said composite signal, and with the output thereof connected to the input of tuning fork driving means.

10. The device of claim 9 wherein said amplifier means comprises:

an isolation amplifier; and a driver amplifier connected to the output of said isolation amplifier.

11. The device of claim 1 wherein said means contiguously disposed with said tuning fork for the driving thereof in such manner as to make it vibrate at its resonant frequency in response to said predetermined frequency component of said composite signal comprises an inductance coil spatially wound around the tines thereof.

12. The invention of claim 11 further characterized by an amplifier means having an input and an output, with the input thereof adapted for receiving said composite signal, and with the output thereof connected to said inductance coil.

13. The device of claim 12 wherein said amplifier means comprises:

an isolation amplifier; and a driver amplifier connected to the output of said isolation amplifier.

14. Means for cancelling a predetermined frequency component from a composite electrical signal having a plurality of frequency components, comprising in combination:

an input terminal for receiving said composite electrical signal;

vibratory means having a resonant frequency identical to that of the aforesaid frequency component to be cancelled;

means effectively connected to said input terminal and spatially disposed from said vibratory means for the driving thereof into its resonant frequency vibration in response to the predetermined frequency component of said composite electrical signal;

means attached to said vibratory means for generating an electrical signal having a frequency identical to the vibration frequency thereof;

means connected to the output of said electrical signal generating means for amplifying the electrical signal therefrom in such manner as to make the amplitude thereof equal to the amplitude of said predetermined frequency component to be cancelled;

means connected to the output of said amplifying means for inverting said amplified electrical signal; and means connected to the output of said inverter means and to the aforesaid input terminal for producing an output signal equal to the difference between said inverted and composite electrical signals.

References Cited

UNITED STATES PATENTS

| | | | |
|---|---|---|---|
| 2,485,580 | 10/1949 | Ferrar et al. ---------- | 179—87 |
| 2,817,779 | 12/1957 | Barnaby et al. -------- | 310—25 |

NATHAN KAUFMAN, Primary Examiner

U.S. Cl. X.R.

330—151